United States Patent [19]

Inoue et al.

[11] Patent Number: 4,695,617

[45] Date of Patent: Sep. 22, 1987

[54] ROOM TEMPERATURE-CURABLE ORGANOPOLYSILOXANE COMPOSITION

[75] Inventors: Yoshio Inoue; Masatoshi Arai; Shinichi Sato; Koji Yokoo, all of Gunma, Japan

[73] Assignee: Shin-Etsu Chemical Co., Ltd., Tokyo, Japan

[21] Appl. No.: 837,588

[22] Filed: Mar. 7, 1986

[30] Foreign Application Priority Data

Mar. 13, 1985 [JP] Japan .................................. 60-49546

[51] Int. Cl.$^4$ .............................................. C08G 77/20
[52] U.S. Cl. ......................................... 528/32; 528/33; 528/34; 528/901; 524/860; 525/104; 525/106
[58] Field of Search ...................... 528/32, 33, 34, 901

[56] References Cited

U.S. PATENT DOCUMENTS

| | | | |
|---|---|---|---|
| 4,180,642 | 12/1979 | Takago | 528/32 |
| 4,248,993 | 2/1981 | Takago | 528/32 |
| 4,302,571 | 11/1981 | Arai et al. | 528/35 |
| 4,485,206 | 11/1984 | Inoue et al. | 524/787 |
| 4,579,963 | 4/1986 | Arai et al. | 528/34 |
| 4,587,354 | 5/1986 | Takago | 556/417 |

*Primary Examiner*—Melvyn I. Marquis
*Attorney, Agent, or Firm*—Jules E. Goldberg

[57] ABSTRACT

The room temperature-curable organopolysiloxane composition of the invention capable of giving a cured rubber can be used advantageously as an insulating material in electric and electronic instruments without causing troubles in contact points which is unavoidable with conventional compositions. The inventive composition is formulated with (a) a diorganopolysiloxane terminated at the molecule molecular chain ends each with a silanolic hydroxy group, (b) an alkenyloxy, e.g. isopropenyloxy, containing silane and (c) a guanidino-substituted organosilicon compound and these components are specified either by the upper limit of the content of low molecular constituents having a specified vapor pressure or higher or the upper limit of the vapor pressure of the compound per se so that the electric contact points near the insulation with the composition are free from exposure to the vapor of organosilicon compounds which may be deposited as an oxide of silicon by sparks.

6 Claims, 1 Drawing Figure

FIGURE
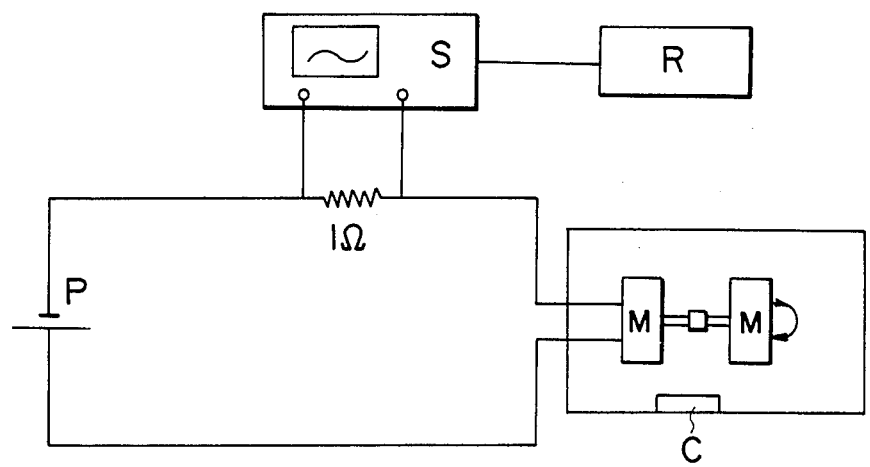

ROOM TEMPERATURE-CURABLE ORGANOPOLYSILOXANE COMPOSITION

BACKGROUND OF THE INVENTION

The present invention relates to a room temperature-curable organopolysiloxane composition or, more particularly, to a room temperature-curable organopolysiloxane composition which is quite satisfactory as an insulating material around contact points in electric and electronic instruments without the problem of unreliable electric contact in the contact points.

As is well known, various kinds of organopolysiloxane compositions are used as an insulating material around contact points in electric and electronic instruments, of which the most widely used ones are room temperature-curable organopolysiloxane compositions curable by the reaction with atmospheric moisture in consideration of convenience and workability in the use thereof.

The crosslink formation in these room temperature-curable organopolysiloxane compositions proceeds by the mechanism of a condensation reaction to produce a condensation product which is usually a compound readily dissipated into the atmosphere. Accordingly, the room temperature-curable organopolysiloxane compositions are classified in relation to the type of the condensation reaction or the condensation product produced thereby into deketonation type, dealcoholation type, deoximation type, decarboxylation type and deamination type producing a ketone, e.g. acetone, an alcohol, e.g. ethyl alcohol, an oxime, e.g. methyl ethyl ketoxime, a carboxylic acid, e.g. acetic acid, an amine, e.g. diethylamine, respecively.

These types of room temperature-curable organopolysiloxane compositions have their own advantages and disadvantages. For example, the compositions of the deoximation type, decarboxylation type and deamination type are not suitable for use as an insulating material around electric and electronic contact points because the gaseous condensation products produced by the crosslinking reaction are corrosive against metals to cause unreliableness in the electric contact in the electric circuits of, for example, motors and relays. Though free from the problems caused by the corrosive condensation product formed in the course of curing, the compositions of deketonation type and dealcoholation type are also not satisfactory as an insulating material around electric and electronic contact points because these compositions comprise an organopolysiloxane as the base component which necessarily contains a low-molecular fraction of the organopolysiloxane having volatility more or less and also comprise a low-molecular organosilane compound as a corsslinking agent so that the vapor of these low-molecular organosilicon compounds is decomposed by the sparks between the contact points to form silicon dioxide which is deposited on the surface of the contact points as an insulating material to cause disorder in the performance of the electric circuits for motors and relays.

SUMMARY OF THE INVENTION

Thus, the room temperature-curable organopolysiloxane composition of the invention, which is free from the above described problems and disadvantages in the conventional compositions, comprises:

(a) 100 parts by weight of an organopolysiloxane, which is preferably a diorganopolysiloxane, terminated at the molecular chain ends each with a silanol group, of which the content of low-molecular organopolysiloxane constituents having a vapor pressure of 0.01 mmHg or higher at 20° C. is not larger than 0.3 % by weight;

(b) from 1 to 25 parts by weight of an alkenyloxy silane compound represented by the general formula

$$R^1_{n-4}Si(O-CR^3=CH-R^2)_n, \quad (I)$$

in which $R^1$ is a substituted or unsubstituted monovalent hydrocarbon group, $R^2$ and $R^3$ are each a hydrogen atom or a substituted or unsubsituted monovalent hydrocarbon group and the subscript n is a number of 3 or 4, or a partial hydrolysis-condensation product thereof having a vapor pressure of 0.3 mmHg or below at 20° C.; and (c) from 0.01 to 10 parts by weight of an organosilane or organopolysiloxane compound having, in a molecule, at least one guanidino group represented by the general formula

$$-N=C(NR_2)_2, \quad (II)$$

in which each of the groups denoted by R is, independently from the others, a hydrogen atom or a substituted or unsubstituted monovalent hydrocarbon group, and having a vapor pressure of 0.3 mmHg or below at 20° C.

BRIEF DESCRIPTION OF THE DRAWING

The figure illustrates a circuit diagram used in the running test of miniature motors in the Examples.

DETAILED DESCRIPTION OF THE PREFERRED EMBODIMENTS

As is understood from the above given summarizing description, the room temperature-curable organopolysiloxane composition of the invention is of the so-called deketonation type and comprises the components (a), (b) and (c) specified above. The component (a) is an organopolysiloxane terminated at the molecular chain ends each with a silanolic hydroxy group, i.e. hydroxy group directly bonded to the silicon atom. The organopolysiloxane is represented by the average unit formula $R_aSiO_{(4-a)/2}$, in which R is a substituted or unsubsituted monovalent hydrocarbon group selected from the class consisting of alkyl groups, e.g. methyl, ethyl, propyl and butyl groups, alkenyl groups, e.g. vinyl and allyl groups, aryl groups, e.g. phenyl and tolyl groups, cycloalkyl groups, e.g. cyclohexyl and cyclopentyl groups, and aralkyl groups, e.g. benzyl and phenylethyl groups, as wewll as those substituted groups obtained by replacing a part or all of the hydrogen atoms in the above named hydrocarbon groups with substituents such as halogen atoms and cyano groups exemplified by chloromethyl, 3,3,3-trifluoropropyl, bromophenyl, 2-cyanoethyl and 3-cyanopropyl groups. The subscript a is a positive number in the range from 1.90 to 2.05. This limitation in the subscript a means that the organopolysiloxane should preferably be a diorganopolysiloxane having a substantially linear molecular structure.

The organopolysiloxane as the component (a) should not contain molecular species of low-molecular organopolysiloxane having a vapor pressure of 0.01 mmHg or higher at 20° C. in an amount in excess of 0.3 % by weight. This limitation of the component (a) is essential since a room temperature-curable organopolysiloxane composition formulated with an organopolysiloxane not satisfying this requirement, when used around electric contact points, may cause troubles and drawbacks in the contact points due to the vapor of the low-molecular organopolysiloxane constituents contained therein.

An organopolysiloxane satisfying such a requirement for vapor pressure can be prepared in several ways. For example, a conventional organopolysiloxane is subjected to molecular distillation to have the low molecular constituents vaporized therefrom. Alternatively, the starting organopolysiloxane is spread in a thin layer and repeatedly washed with an organic solvent, such as acetone, methyl alcohol, ethyl alcohol, dioxane and the like, capable of dissolving such low-molecular constituents in the organopolysiloxane while high-molecular constituents are hardly dissolved therein. Further alternatively, it is known that the ring-opening polymerization reaction of a hexaorganopolysiloxane can produce an organopolysiloxane scarcely containing low-molecular constituents when it is polymerizd in the presence of lithium hydroxide or a specific penta-coordinating organosilicon compound. Determination of the content of the low-molecular constituents in the organopolysiloxane can be performed by the gas chromatographic analysis of an extract obtained by extracting the organopolysiloxane with a solvent capable of dissolving the low-molecular constituents alone such as acetone and the like.

The organopolysiloxane as the component (a) should have a viscosity of at least 25 centistokes or, preferably, in the range from 500 to 100,000 centistokes at 25° C. because a room temperature-curable composition formulated with an organopolysiloxane having a viscosity lower than the above mentioned lower limit cannot give a cured product having good rubbery elasticity.

It is optional that the organopolysiloxane as the component (a) is partly replaced with another organopolysiloxane terminated at the molecular chain ends each with a group other than silanolic hydroxy group such as a trimethylsilyl group although it is essential that the amount of the replacing organopolysiloxane should not exceed 50% by weight of the component (a) and that the replacing organopolysiloxane also satisfies the requirement in respect of the content of low-molecular constituents having a vapor pressure of 0.01 mmHg or higher at 20° C.

The component (b) is an alkenyloxy silane compound represented by the above given general formula (I) or a partial hy- drolysis-condensation product thereof and acts as a crosslinking agent of the component (a). In the general formula (I), $R^1$ is a substituted or unsubstituted monovalent hydrocarban group selected from the same class of the groups given above as the examples of the group denoted by R in the component (a). The groups denoted by $R^2$ and $R^3$ are each a hydrogen atom or a substituted or unsubstituted monovalent hydrocarbon group selected, independently each from the other, from the same class of the groups given as the examples of the group R. The subscript n is an integer of 3 or 4.

Particular examples of the alkenyloxy silane compound as the component (b) include phenyl tri(isopropenyloxy) silane, propyl tri(isopropenyloxy) silane, tetra(isopropenyloxy) silane, 3,3,3-trifluoropropyl tri(isopropenyloxy) silane, 3-chloropropyl tri(isopropenyloxy) silane, methyl tri(1-phenyl ethynyloxy) silane, methyl tri(1-isobutenyloxy) silane, methyl tri(1-methyl-1-propenyloxy) silane, vinyl tri(cyclopentenyloxy) silane, methyl tri(cyclohexenyloxy) silane and the like. These alkenyloxy silanes can be prepared by the dehydrohalogenation reaction of a ketone compound and a halosilane compound in the presence of an acid acceptor such as an organic amine, e.g. triethyl amine and dimethyl aniline, or metallic sodium promoted, if necessary, by a catalyst such as zinc chloride.

The amount of the alkenyloxy silane as the component (b) in the inventive composition should be in the range from 1 to 25 parts by weight per 100 parts by weight of the component (a). When the amount of the component (b) is decreased below the above mentioned lower limit, the composition cannot give a cured product having properties as desired or may be subject to gelation in the course of preparation or during storage, in particular, when the amount of the component (b) is only a little below the above mentioned lower limit. When the amount of the component (b) is too large, on the other hand, the room temperature-curable composition may exhibit unduly large shrinkage by curing or the cured product thereof may have poor rubbery elasticity.

The component (c) comprised in the inventive room temperature-curable organopolysiloxane composition is an organosilane or organopolysiloxane compound having, in a molecule, at least one guanidino group represented by the above given general formula (II), which serves as a curing aid of the composition. In the formula, each of the groups denoted by the symbol R is, independently from the others, a hydrogen atom or a substituted or unsubstituted monovalent hydrocarbon group selected from the same class of the groups given as the examples of $R^2$ and $R^3$ The compound as the component (c) also should have a vapor pressure of 0.3 mmHg or below at 20° C. The guanidino group of the formula (II) should be bonded to the silicon atom through a divalent group which is not particularly limitative but preferably an alkylene group such as a propylene group —CH$_2$CH$_2$CH$_2$— or an oxyalkylene group.

Exemplary of the guanidino-containing organosilane or organopolysiloxane compound as the component (c) are those expressed by the following structural formulas, in which the symbols Me, Et and Ph denote methyl, ethyl and phenyl groups, respectively:

(Me$_2$N)$_2$C=N—CH$_2$CH$_2$CH$_2$Si(OMe)$_3$;
(Me$_2$N)$_2$C=N—CH$_2$CH$_2$CH$_2$Si(Me)(OMe)$_2$;
(Me$_2$N)$_2$C=N—CH$_2$CH$_2$CH$_2$Si(OSiMe$_3$)$_3$;
(Me$_2$N)$_2$C=N—CH$_2$CH$_2$CH$_2$Si(OEt)$_3$;
(PhMeN)$_2$C=N—CH$_2$CH$_2$CH$_2$Si(O—CMe=CH$_2$)$_3$;
(Me$_2$N)$_2$C=N—CH$_2$CH$_2$CH$_2$Si(Me)(O—N=CMeEt)$_2$; and

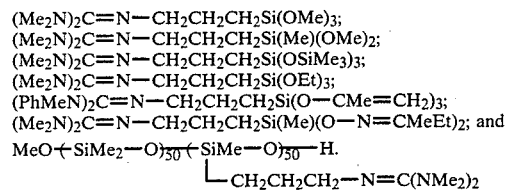

Among the above named compounds, 3-(1,1,3,3-tetramethylguanidino)propyl trimethoxy silane expressed by the first given formula is the most preferable for the reason of easiness of the synthetic preparation thereof. These guanidino-containing organosilicon compounds can be prepared by the dehydrohalogenation reaction between guanidine or a substituted guanidine compound and an organosilane or organopolysiloxane having a halogen-substituted alkyl group in the presence of an acid acceptor.

The amount of the component (c) in the inventive composition should be in the range from 0.01 to 10 parts by weight per 100 parts by weight of the component (a). When the amount thereof is smaller than the above mentioned lower limit, the composition is disadvantageous due to the unduly long time taken for the tack-free filming on the surface when the composition is exposed to the atmospheric air or poor curability of the composition, in particular, in the core portion of a thick body. When the amount of the component (c) is in excess of 10 parts by weight, on the other hand, a great inconvenience is caused in the works with the composition due to the extreme decrease of the time taken for the filming on the surface down to a few seconds or less in addition to the problem of discoloration of the compound when it is heated.

As is already mentioned, the components (b) and (c) each should have a vapor pressure of 0.3 mmHg or below at 20° C. because the compounds having a vapor pressure higher than above may be prematurely dissipated before they can pertain to the curing reaction in the composition and the vapor of the compounds may cause drawbacks in electric contact points when the composition is used therearound.

The room temperature-curable organopolysiloxane composition of the invention can be prepared by uniformly blending the above described components (a), (b), and (c) in a specified proportion in a dry atmosphere. The composition may be admixed, if desired, with a filler exemplified by finely divided silica fillers, e.g. fumed silica and precipitated silica, diatomaceous earth, metal oxides, e.g. iron oxide, zinc oxide and titanium dioxide, with or without a hydrophobic surface treatment using an organosilane, metal carbonates, e.g. calcium carbonate, magnesium carbonate and zinc carbonate, asbestos, glass wool, carbon black, finely pulverized mica, powder of fused quartz, powders of synthetic resins, e.g. polystyrene, polyvinyl chloride and polypropylene, and the like. These fillers should be completely dry prior to incorporation into the composition. The amount of the filler in the inventive composition is not particularly limitative according to the particular application of the composition. It is further optional that the inventive composition is admixed with various kinds of additives conventionally added to similar room temperature-curable organopolysiloxane compositions including pigments, dyes, aging retarders, antioxidants, antistatic agents, flame retardant agents, e.g. anitmony oxide and chlorinated paraffins, thermal conductivity impovers, e.g. boron nitride, and others. If desired, the composition may be admixed with an adhesion aid which is a so-called carbon-functional organosilane compound having a functional group such as an amino, epoxy or thiol group. It is of course that such a carbon-functional silane compound also should satisfy the requirement that the vapor pressure thereof is 0.3 mmHg or below at 20° C. The composition of the invention can be used as dissolved in or diluted with an organic solvent such as hydrocarbon solvents, e.g. toluene and petroleum ether, ketones, esters and the like according to need.

The room temperature-curable organopolysiloxane composition of the invention is very stable when it is stored under a hermetically sealed condition but can be rapidly cured when it is exposed to the atmospheric air by the reaction with atmospheric moisture and converted into a rubbery elastomer which firmly adheres to the substrate surface of, in particular, metal on which it has been cured. Advantageouly, the curing reaction of the composition proceeds without producing any toxic or corrosive gaseous by-product which may cause rusting on the substrate surface. Therefore, the inventive composition can be used as an insulating material around electric or electronic contact points in motors and relays without troubles. It is of course that the inventive composition can be used in other conventional applications of room temperature-curable organopolysiloxane compositions such as adhesives, coating materials, sealing and caulking materials, water-repellent agents, textile-finishing agents, surface-releasing agents and others.

In the following, the room temperature-curable organopolysiloxane composition of the invention is illustrated in more detail by way of examples preceded by the description of the procedures for the preparation of the silane compounds used as the components (b) and (c) in the Examples. In the Examples, the expression of "parts" always refers to "parts by weight" and the values of viscosity are those obtained by the measurement at 25° C.

PREPARATION 1.

Phenyl tri(isopropenyloxy) silane was prepared in the following synthetic procedure. Thus, 376.0 g of acetone, 404.0 g of triethyl amine, 75.0 g of N,N-dimethyl formamide and 1.3 g of copper(I) chloride were introduced into a four-necked flask of 2-liter capacity equipped with a stirrer rod, a dropping funnel, a thermometer and a reflux condenser and 211.6 g of phenyl trichrorosilane were added dropwise into the mixture in the flask over a period of 1 hour followed by further continued agitation of the mixture for 12 hours under reflux to complete the reaction. Thereafter, the triethyl amine hydrochloride precipitated in the reaction mixture was removed by filtration and the filtrate was distilled under reduced pressure to give 163.0 g of a fraction boiling at 117° to 119° C. under a pressure of 5 mmHg and having a refractive index of 1.486 at 25° C. This product could be identified to be phenyl tri(isopropenyloxy) silane from the results of infrared spectroscopic analysis, mass spectrometric analysis and elementary analysis given below. The above mentioned yield of the product was 59.0% of the theoretical value.

Infrared absorption spectrum: $\nu_{C=C}$ at 1640 cm$^{-1}$.

Mass spectrum: principal peak at mass number 276 (calculated molecular weight 276.41).

| Elementary analysis: | | | |
| --- | --- | --- | --- |
| | C, % | H, % | Si, % |
| Calculated | 65.18 | 7.29 | 10.16 |
| Found | 65.3 | 7.1 | 10.0 |

PREPARATION 2

3-(1,1,3,3-Tetramethylguanidino)propyl trimethoxy silane was prepared in the following synthetic procedure. Thus, 345 g (3.00 moles) of 1,1,3,3-tetramethyl guanidine and 208 g (1.00 mole) of 3-chloropopyl trimethoxy silane were introduced into a four-necked flask of 1-liter capacity equipped with a stirrer rod, a thermometer, a reflux condenser and a gas inlet tube and the mixture was heated at 120° to 130° C. for 4 hours followed by cooling to room temperature. The hydrochloride of 1,1,3,3-tetramethyl guanidine precipitated in the reaction mixture was removed by filtration and the filtrate was distilled under reduced pressure to give 166 g of a fraction boiling at 135° to 137° C. under a pressure of 10 mmHg. This product was a liquid having specific gravity of 1.073 at 25° C. and a refractive index of 1.4540 at 25° C. and could be identified to be 3-(1,1,3,3- tetramethylguanidino)propyl trimethoxy silane from the infrared absorption spectrum in which absorption bands were found at 1045 cm$^{-1}$, 1200 cm$^{-1}$ and 1620 cm$^{-1}$ assignable to the linkages of Si—O—CH$_3$, —N(CH$_3$)$_2$ and C=N—, respectively, while no absorption band was found assignable to the linkage of N—H. The above mentioned yield of the product corresponds to 58% of the theoretical value.

EXAMPLE 1

A base blend was prepared by mixing 100 parts of a dimethylpolysiloxane having a viscosity of 5100 centistokes and terminated at both molecular chain ends each with a silanolic hydroxy group, of which the content of low-molecular constituents having a vapor pressure of 0.01 mmHg or higher at 20° C. was 0.10% by weight, and 12 parts of a fumed silica filler having a specific surface area of 200 m$^2$/g and surface-treated with trimethyl chlorosilane and, after passing once through a three-roller mill, the blend was further admixed with 6 parts of phenyl tri(isopropenyloxy) silane pepared in Preparation 1 and 0.5 part of 3-(1,1,3,3-tetramethylguanidino)propyl trimethoxy silane prepared in Preparation 2 under an anhydrous condition followed by deaertion under reduced pressure. The thus obtained composition is referred to as I-1 hereinbelow.

The composition I-1 was stored under a hermetically sealed condition for 6 months without noticeable changes and then spread and shaped into a sheet of 2 mm thickness which was kept standing for 7 days in an atomosphere of 55% relative humidity at 23° C. to be converted into a cured rubber sheet. The mechanical properties were determined of the rubber sheet either as cured in the above mentioned conditions or after succeeding heating for 5 days at 150° C. or 200° C. according to the procedure specified in JIS C 2123 to give the results shown in Table 1 below.

TABLE 1

|  | As cured | After 5 days at 150° C. | After 5 days at 200° C. |
| --- | --- | --- | --- |
| Hardness, JIS | 31 | 32 | 34 |
| Tensile strength, kg/cm$^2$ | 18 | 20 | 18 |
| Ultimate elongation, % | 320 | 300 | 280 |

For comparison, three more compositions, referred to as I-2, I-3 and I-4 hereinbelow, were prepared in the same manner as above excepting replacement of the dimethylpolysiloxane of low volatile matter content used in the preparation of the composition I-1 with similar ones containing 0.23%, 0.62% and 0.98%, respectively, by weight of low molecular constituents having a vapor pressure of 0.01 mmHg or higher at 20° C.

Running tests of miniature motors were conducted according to the diagram illustrated in the figure of the accompanying drawing using three motors in each test in which the motors M were driven at 2.0 volts and 150 mA by use of a variable voltage-stabilized power source P while one of the compositions I-1 to I-4 indicated by C was placed below the motors M as is illustrated in the figure and the wave form generated in the motors was observed by use of a storage-type synchroscope S connected to a recorder R. The motors M and the composition C were contained in a box and the composition C was heated at 200° C.

After 500 hours of continued running of the motors M, the wave form generated therefrom was quite normal when the composition C was I-1 while two of three motors generated abnormal wave forms with the composition I-2 and all of three generated abnormal wave forms with the compositions I-3 and I-4.

EXAMPLE 2

A room temperature-curable organopolysiloxane composition, referred to as II-1 hereinbelow, was prepared in the same formulation and in the same manner as in the preparation of the composition I-1 in Example 1 except that the silica filler was replaced with another fumed silica filler having a specific surface area of 130 m$^2$/g and surface-treated with trimethyl chlorosilane and that the composition further contained 1 part of 3-aminopropyl triethoxy silane per 100 parts of the dimethylpolysiloxane.

The composition II-1 could be stored under a hermetically sealed condition for 6 months or longer without noticeable changes in color and consistency. When the composition was spread and shaped into a sheet of 2 mm thickness and kept standing in an atmosphere of 55% relative humidity at 23° C., a tack-free surface film was formed within 3 minutes and the sheet was cured at a euring velocity of 2 to 3 mm/day into a cured rubber sheet. The mechanical properties were determined of the rubber sheet either as cured by standing for 7 days under the above mentioned conditions or after subsequent heating for 5 days at 150° C. or 200° C. to give the results shown in Table 2 below. The composition was absolutely free from corrosiveness as examined according to the procedure specified in MIL A-46146.

TABLE 2

|  | As cured | After 5 days at 150° C. | After 5 days at 200° C. |
| --- | --- | --- | --- |
| Hardness, JIS | 31 | 32 | 33 |
| Tensile strength, kg/cm$^2$ | 18 | 20 | 18 |
| Ultimate elongation, % | 320 | 320 | 300 |
| Adhesive bonding strength, kg/cm$^2$ | — | 10.8 | 11.2 |

For comparison, four more compositions, referred to as II-2, II-3, II-4 and II-5 hereinbelow, were prepared in the same formulation as in the preparation of the composition II-1 except that the phenyl tri(isopropenyloxy) silane having a vapor pressure of 0.017 mmHg at 20° C. was replaced with the same amount of vinyl tri(isopropenyloxy) silane in II-2, methyl trimethoxy silane in II-3 and II-4 and vinyl tri(butanoxy) monosilane in II-5 having vapor pressures of 0.54 mmHg, 25.0 mmHg and 0.0003 mmHg, respectively, at 20° C., that the guanidino-substituted silane compound was replaced with the same amount of tetrapropyl titanate in II-3 and with 0.1 part of tetrapropyl titanate in II-5 and that 0.1 part of tetrapropyl titanate was further added in II-4

Each of the compositions II-1 to II-5 was used in the running test of miniature motors in the same manner as in Example 1 to find that no abnormal wave forms were generated at all with the composition II-1 while one of three motors generated abnormal wave forms with the composition II-2 and all of the three motors generated abnormal wave forms with each of the compositions II-3, II-4 and II-5.

EXAMPLE 3

A base blend was prepared by mixing 90 parts of a dimethylpolysiloxane having a viscosity of 20,800 centistokes and terminated at both molecular chain ends each with a silanolic hydroxy group, of which the content of low molecular constituents having a vapor pressure of 0.01 mmHg or higher at 20° C. was 0.18% by weight, 10 parts of a dimethylpolysiloxane having a viscosity of 500 centistokes and terminated at both molecular chain ends each with a trimethylsilyl group, of which the content of low molecular constituents having a vapor pressure of 0.01 mmHg or higher at 20° C. was 0.05% by weight, and 15 parts of a fumed silica filler having a specific surface area of 180 m²/g and surface-treated with a dimethylpolysiloxane and, after passing once through a three-roller mill, the base blend was further admixed with 6 parts of phenyl tri(isopropenyloxy) silane prepared in Preparation 1, 0.5 part of 3-aminopropyl trimethoxy silane and 0.6 part of 3-(1,1,3,3-tetramethylguanidino)propyl triethoxy silane prepared in Preparation 2 in an anhydrous condition to give a composition III.

The composition III could be stored under a hermetically sealed condition without noticeable changes for 6 months or longer. The composition III had no corrosiveness and the curing behavior thereof was about the same as that of the composition II-1 prepared in Example 2 in respect of filming and curing velocity. The cured rubber sheet of the composition III having a thickness of 2 mm obtained by standing for 7 days in an atmosphere of 55% relative humidity at 23° C. had mechanical properties of: hardness, JIS, of 25; tensile strngth of 21 kg/cm²; ultimate elongation of 530%; and adhesive bonding strength of 11.8 kg/cm².

Running tests of miniature motors were undertaken in the same manner as in Example 1 with the composition III at 20° C. for 500 hours and at 90° C. for 120 hours to find that none of the three motors in each test generated abnormal wave forms.

EXAMPLE 4

A base blend was prepared by mixing 100 parts of the same silanol-terminated dimethylpolysiloxane as used in Example 3 and 100 parts of a quartz powder having an average particle diameter of about 5μm and, after passing once through a three-roller mill, the base blend was further admixed with 6 parts of 3,3,3-trifluoropropyl tri(isopropenyloxy) silane synthesized in a manner similar to Preparation 1 and 0.7 part of 3-(1,1,3,3-terramethylguanidino)propyl tris(trimethylsiloxy) silane synthesized in a manner similar to Preparation 2 in an anhydrous condition followed by deaeration to give a composition IV.

The results of the storage test, corrosiveness test and running test of miniature motors at 20° C. for 500 hours undertaken of the composition IV were as satisfactory as with the composition III. Curing of the composition IV proceeded at a velocity of 2 to 3 mm/day with surface filming within 7 minutes. The mechanical properties of the cured rubber sheet of 2 mm thickness obtained by standing for 7 days in an atmosphere of 55% relative humidity at 23° C. were: hardness, JIS, of 40; tensile strength of 23 kg/cm²; ultimate elongation of 360%; and adhesive bonding strength of 9.8 kg/cm².

EXAMPLE 5

A base blend was prepared by mixing 100 parts of a dimethylpolysiloxane having a viscosity of 9800 centistokes and terminated at both molecular chain ends each with a silanolic hydroxy group, of which the content of low molecular constituents having a vapor pressure of 0.01 mmHg or higher at 20° C. was 0.15% by weight, and 10 parts of a carbon powder and, after passing once through a three-roller mill, the base blend was further admixed with 6 parts of 3-chloropropyl tri(isopropenyloxy) silane synthesized in a manner similar to Preparation 1, 0.5 part of 3-aminopropyl trimethoxy silane and 0.5 part of 3-(1,1,3,3-tetramethylguanidino)propyl methyl dimethoxy silane synthesized in a manner similar to Preparation 2 in an anhydrous condition followed by deaeration to give a composition, referred to as V hereinbelow.

The results of the storage test, corrosiveness test and running test of miniature motors undertaken of the composition V were as satisfactory as with the composition IV. Curing of the composition V proceeded at a velocity of 2 to 3 mm/day with surface filming within 6 minutes. The mechanical properties of the cured rubber sheet of 2 mm thickness obtained by standing for 7 days in an atmosphere of 55% relative humidity at 23° C. were: hardness, JIS, of 40, tensile strength of 17 kg/cm²; ultimate elongation of 280%; and adhesive bonding strength of 10.2 kg/cm².

What is claimed is:

1. A room temperature-curable organopolysiloxane composition which comprises:
   (a) 100 parts by weight of an organopolysiloxane terminated at the molecular chain ends each with a silanolic hydroxy group, of which the content of low molecular constituents having a vapor pressure of 0.01 mmHg or higher at 20° C. is not larger than 0.3% by weight;
   (b) from 1 to 25 parts by weight of an alkenyloxy-containing organosilane compound represented by the general formula $R^1_{n-4}Si(O-CR^3=CH-R^2)_n$,

in which $R^1$ is a substituted or unsubstituted monovalent hydrocarbon group, $R^2$ and $R^3$ are each a hydrogen atom or a substituted or unsubstituted monovalent hydrocarban group and the subscript n is a number of 3 or 4, or a partial hydrolysis-condensation product thereof having a vapor pressure of 0.3 mmHg or below at 20° C.; and
   (c) from 0.01 to 10 parts by weight of an organosilane or organopolysiloxane compound having, in a molecule, at least on guanidino group represented by the general formula $-N=C(NR_2)_2$,

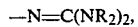

in which each of the groups denoted by R is, independently from the others, a hydrogen atom or a substituted or unsubstituted monovalent hydrocarbon group, bonded to the silicon atom through a divalent group and having a vapor pressure of 0.3 mmHg or below at 20° C.

2. The room temperature-curable organopolysiloxane composition of claim 1 wherein the organopolysiloxane as the component (a) is a dimethylpolysiloxane terminated at both molecular chain ends each with a silanolic hydroxy group.

3. The room temperature-curable organopolysiloxane composition of claim 1 wherein the organopolysiloxane as the component (a) has a viscosity in the range from 500 to 100,000 centistokes at 25° C.

4. The room temperature-curable organopolysiloxane composition of claim 1 wherein the alkenyloxy group in the component (b) is an isopropenyloxy group 5. The room temperature-curable organopolysiloxane composition of claim 1 wherein the guanidino group in the component (c) is a 1,1,3,3-tetramethylguanidino group.

6. The room temperature-curable organopolysiloxane composition of claim 1 wherein the divalent group through which the guanidino group is bonded to the silicon atom in the component (c) is a propylene group of the formula —$CH_2CH_2CH_2$—.

* * * * *